July 2, 1946.   T. T. BAKER   2,403,327
MANUFACTURE OF PHOTOGRAPHIC EMULSIONS
Filed May 31, 1945
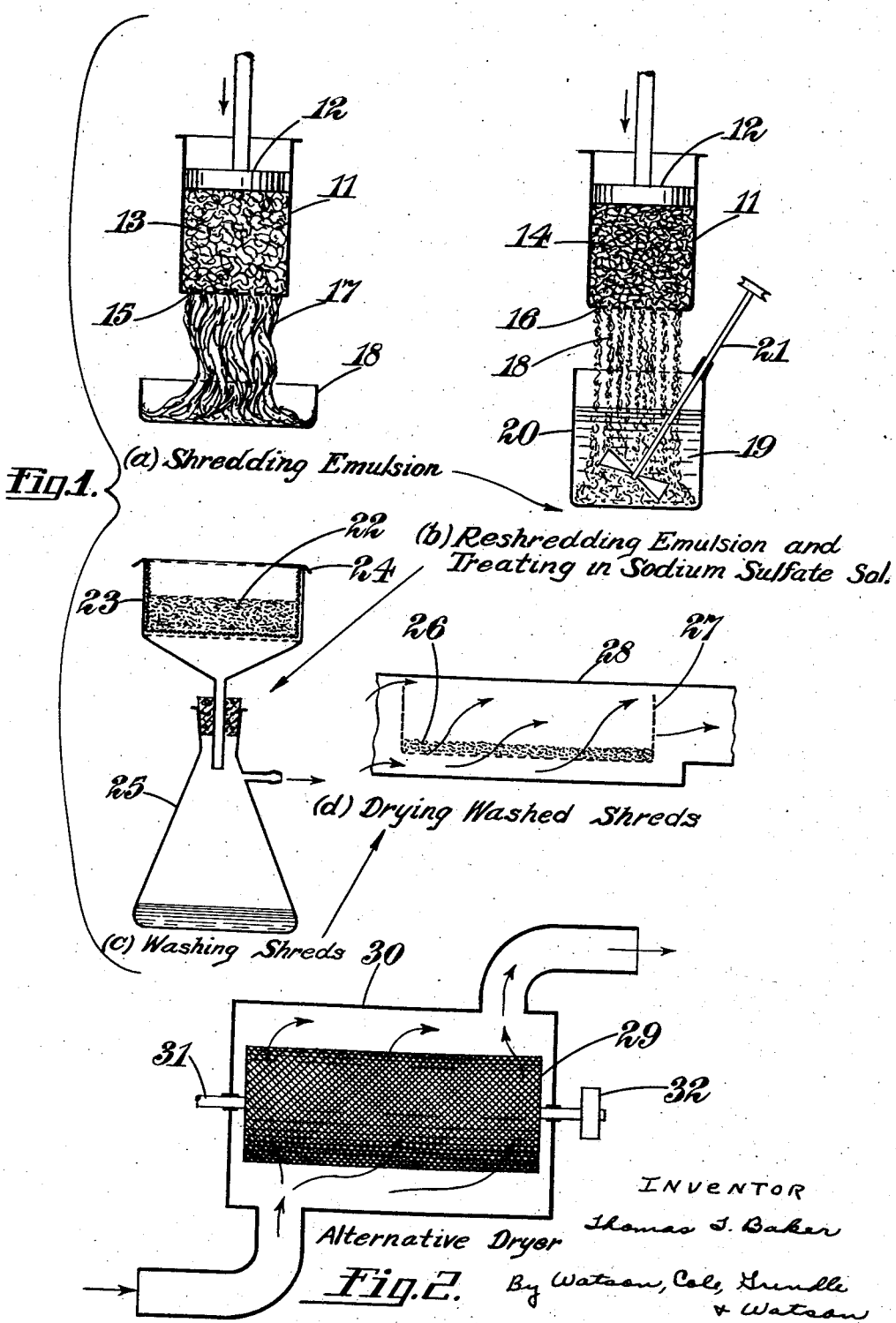

Patented July 2, 1946

2,403,327

UNITED STATES PATENT OFFICE 2,403,327

MANUFACTURE OF PHOTOGRAPHIC EMULSIONS

Thomas Thorne Baker, Pinner, England

Application May 31, 1945, Serial No. 596,918
In Great Britain May 30, 1944

10 Claims. (Cl. 95—7)

(Granted under the provisions of sec. 14, act of March 2, 1927; 357 O. G. 5)

This invention is for improvements in or relating to the manufacture of photographic emulsions and has particular reference to the preparation of an emulsion by a method which involves the removal of a considerable part of its water so that it can be handled and stored in a more or less dry state in the form of small granules or grains.

It has been shown by Carroll & Hubbard in Communication No. 340 of the Bureau of Standards, U. S. A. (and reprinted in Bureau of Standards, Journal of Research, vol. 7, August, 1931) that an emulsion if not "finished," i. e. not matured, to completion will go on maturing in the dry state and so alter in its photographic characteristics, and it is an inherent part of the present invention that the part-maturation of the emulsion during its manufacture plus the extra maturing to which it is subjected in drying results in an optimum overall maturation, thus providing a well-stabilized product. In other words, the heat applied in the drying which constitutes one of the steps of the present invention is designed to complete the digestion or maturation or finishing of the emulsion and to stabilize it so that if kept for long periods even in hot climates its photographic characteristics on being used for sensitizing purposes are not appreciably changed. Sensitometric tests carried out over a long period confirm that the emulsion made in accordance with the present invention does not alter appreciably in photographic characteristics on long keeping.

In United States Application Ser. No. 493,922 filed July 8, 1943, I have described a method of preparing a partially but not completely digested gelatino-silver-halide emulsion and after washing the emulsion in the known manner to shred the jelly through a shredder plate with standard size perforations and then to re-shred these shreds through fine nickel or silver or other innocuous gauze of a mesh of about 30 per inch so as to mince them into tiny granules of jelly. The minced granules are then dried with the aid of heat but in so doing the granules are apt to agglomerate, amalgamate or stick together in lumps, whereas it is very important from the point of view of obtaining a product which is readily handled and used that the granules should remain discrete and well separated so that the material will pour more or less like coarse sand.

One method of desiccation designed to minimise or obviate the disadvantage above-referred to involves the treatment of the granules with a dehydrating liquid such as methyl or ethyl alcohol or acetone.

It is an object of the present invention to provide a method of preparing granular gelatino-silver-halide photographic emulsion avoiding the use of alcohol or other liquid dehydrating agents and enabling the drying operation to be carried out by heating.

I have found that drying of granules of emulsion by heating can be carried out without risk of the granules agglomerating, amalgamating or sticking if, prior to the application of heat, the surfaces of the granules are subjected to a hardening treatment.

According to the present invention, there is provided a method of preparing a photographic gelatin emulsion which is semi-dried, as hereinafter defined, which method comprises shredding a partially stabilized silver halide gelatin emulsion treating the granules thus formed with a solution of sodium sulphate to harden the surfaces of the granules and thereafter drying the granules at a temperature not substantially above 90° F. to form a freely-flowing granular mass.

The term "semi-dried" as applied in this specification to a gelatin emulsion means an emulsion containing 4 to 14% moisture. It is known that air-dried leaf gelatin may contain about 16.5% moisture and after drying over sulphuric acid for a year the moisture content may still be about 2%. Drying to a moisture content substantially lower than 4% produces a gelatin which has inter alia a reduced power of adhesion upon being reconstituted.

By treatment with sodium sulphate solution, preferably a concentrated solution, e. g. one which is substantially saturated the surface or epidermis of each individual granule of the shredded emulsion is hardened so that heat can be applied, preferably in the form of warm dry air at a temperature of between 85° F. and not substantially above 90° F. and having a relative humidity of 25 to 35% to obtain the granules of the dried emulsion in the freely flowing form.

Sodium sulphate is known to prevent the swelling of gelatin in the presence of water, and I have found that the presence in a solution of this substance of an alum, e. g. potash alum in a minor proportion, e. g., 0.02 to 2.5% and preferably ·1 to 2.5% by weight of the weight of the sodium sulphate hardens the surface layers of the granules and thus prevents agglomeration.

One example of a solution containing sodium sulphate and potash alum for use in accordance with the present invention consists of water 200 litres, sodium sulphate 40 kilograms, potash alum 1 kilogram. The amount of potash alum must not be unduly increased otherwise there is difficulty in reconstituting the emulsion and the actual proportion of potash alum will depend inter alia on the character of the gelatin and of the water.

The granules of gelatin emulsion are preferably dropped into the sodium sulphate solution or sodium sulphate/potash alum solution and allowed to remain for example for a time of the order of 20 minutes and are then drained free from liquid and washed once or twice with ice-cold water to wash away most of the excess of sodium sulphate. The well-drained granules are then spread on nickel, silver, stainless steel or other trays of gauze of a metal innocuous to the emulsion or put into a rotating gauze drum of such metal and subjected to treatment with warm air, e. g. at a temperature between 85° and 95° F. or at a somewhat higher temperature should this be indicated by preliminary experiment to be necessary to complete the maturation or finishing of the emulsion. The drying operation may take, for example, about 12 hours.

The invention may be applied with particular advantage to the treatment of a partially-digested silver halide emulsion, completion of the digestion or maturation of the emulsion being effected during the drying stage. Alternatively, but less desirably, the invention may be carried into effect upon a fully digested or finished silver halide emulsion.

In carrying out the present invention, emulsions of a far more concentrated type than those normally employed may be used. Thus, a processed emulsion containing when finished 50 grams of silver bromide and 80 grams of gelatin per litre which would in the first stage be made up to about one-half litre only, owing to the swelling during washing, may in accordance with the present invention be so highly concentrated that its volume prior to washing would be of the order of one-quarter litre and about one-half litre after washing. It will be understood that the process of semi-drying is thus cut down by at least one-half.

Following is a description by way of example and with reference to the accompanying diagrammatic drawing of one method of carrying the invention into effect.

In the drawing:

Figure 1 shows (a) the first shredding step in preparing the granules of emulsion; (b) the second shredding step and treatment of the granules in sodium sulphate solution; (c) washing and draining the shreds; and (d) one form of drying apparatus for drying washed shreds.

Figure 2 shows an alternative form of drying apparatus.

Referring to Figure 1 in which similar reference numerals denote similar parts, 11 is the chamber of a shredding press which is provided with piston 12 for forcing the set gelatin emulsion 13 or the shredded gelatin emulsion 14 through the shredder plate 15 or the gauze of innocuous metal 16. The shredded emulsion 17 is collected in a receptacle 18. The doubly-shredded emulsion 18 is dropped into a solution 19 of sodium sulphate containing potash alum in a vessel 20 provided with a stirrer 21.

Draining of the shredded and washed emulsion 22 is carried out in a funnel 23, the granules being supported by a piece of fabric 24. Suction is applied to the granules by way of the fiber flask 25.

In Figure 1 the drained granules 26 are supported in a gauze tray 27 which is placed in a drying chamber 28. Warm air is passed over and between the granules in the direction shown by the arrows.

In the alternative drying apparatus shown in Figure 2, the drained granules are placed in a gauze drum 29 mounted in a drying chamber 30 through which warm air is passed in the direction of the arrows. The drum is mounted on shaft 31 driven by pulley 32.

An emulsion is prepared as follows: Three solutions are first made up as under,

| | Grams |
|---|---|
| A. Water | 200 |
| Ammonium bromide | 16 |
| Ammonium iodide | 0.5 |
| Gelatin | 6.0 |
| (Used at 100° F.) | |
| B. Silver nitrate | 25 |
| Water | 10 |
| Ammonia, sufficient in amount just to redissolve the precipitate at first formed. | |
| (Used at 65° F.) | |
| C. Silver nitrate | 25 |
| Water | 90 |
| (Used at 110° F.) | |

Solution B is added to solution A with rapid stirring and after being allowed to stand for 5 minutes solution C is added with rapid stirring. At once thereafter 104 grams of dry gelatin are added and dissolved, the mixture poured into an ice-cold jar and allowed to stand in ice water with stirring until gelling commences.

Next day, the set emulsion is shredded by passing it through a perforated plate of innocuous metal and the shreds or noodles are washed for 40 minutes with 3 minute changes of water or until the pH of the last wash water is pH 8 or slightly under.

The washed emulsion is then re-melted, the temperature raised to 120° F. and after the addition of 5 grams of a 2% solution of glacial acetic acid is digested at that temperature for 40 minutes. It is then set and the set jelly conveniently at a temperature of about 40° F. is shredded first through a standard shredding press and then through wire gauze (about 30 meshes per linear inch) made of a metal innocuous to the emulsion, the very small granules after the second shredding being dropped into a sodium sulphate potash alum solution consisting of sodium sulphate 850 grams, 5% aqueous solution of potash alum 18 cc. and water 4,000 cc.

The granules are allowed to stand in contact with this solution for about 20 minutes and are then removed, drained e. g. by suction, washed with one or two applications of ice-cold water to wash away most of the excess of the sodium sulphate and after again draining are dried in a current of warm air having a relative humidity of 25 to 35% and a temperature of between 85° and 90° F. or a little over.

The drying operation may be carried out in a rotating gauze drum of innocuous metal (as indicated in Figure 2) or in trays of gauze which are arranged in a drying chamber provided with means for introducing the warm air and for leading away the air after it has swept through and over the granules (see Figure 1).

I claim:

1. A method of preparing a photographic gelatin emulsion in the form of apparently dry and freely-flowing granules which method comprises shredding a silver halide gelatin emulsion, treating the granules thus formed with a concentrated solution of sodium sulphate of dehydrating strength to harden the surfaces of the granules and thereafter drying the granules at a temperature of about 85° to 95° F. until the moisture content of said granules is reduced to 4 to 14%.

2. A method of preparing a matured photographic gelatin emulsion in the form of apparently dry and freely flowing granules which method comprises shredding a partially digested silver halide gelatin emulsion into granules, treating the granules with a substantially saturated solution of sodium sulphate containing a minor proportion of an alum to harden the surfaces of the granules separating the granules from the liquid and thereafter heating the granules in warm air at a temperature of about 85° to 95° F. until the moisture content of said granules is reduced to 4 to 14% to complete the maturation of the emulsion and to bring the granules to the apparently dry and freely flowing condition.

3. A method of preparing a photographic gelatin emulsion in the form of apparently dry and freely-flowing granules which method comprises shredding a fully digested silver halide gelatin emulsion into granules, treating the granules with a substantially saturated aqueous solution of sodium sulphate containing a minor proportion of an alum, separating the granules from the liquid and thereafter heating the granules in warm air at a temperature of about 85° to 95° F. until the moisture content of said granules is reduced to 4 to 14%, and until the granules attain the apparently dry and freely flowing condition.

4. A method of preparing a matured photographic gelatin emulsion in the form of apparently dry and freely flowing granules which method comprises forming a partially matured silver halide photographic gelatin emulsion into granules by double shredding, treating the granules with a substantially saturated aqueous solution of sodium sulphate containing from 0.02 to 2.5% by weight of the weight of the sodium sulphate to effect the hardening of the surface layers of the said granules, separating the granules from the liquid and subjecting them to drying at a temperature of about 85° to about 95° F. in a current of air until the moisture content of said granules is reduced to 4 to 14% and the granules are apparently dry and freely flowing and until the emulsion is substantially completely matured.

5. A method of preparing a matured photographic gelatin emulsion in the form of apparently dry and freely-flowing granules which method comprises forming a partially matured silver halide photographic gelatin emulsion into granules by double shredding, immersing the said granules in a substantially saturated solution of sodium sulphate containing a minor proportion of potash alum for a time sufficient to effect hardening of the surface layers of the granules but insufficient to affect substantially the subsequent reconstitution of the emulsion, separating the granules from the liquid and subjecting them to drying at a temperature of about 85° to 95° F. in a current of air until the moisture content of said granules is reduced to 4 to 14% and the granules are apparently dry and freely flowing and until the emulsion is substantially completely matured.

6. A method of preparing a matured photographic gelatin emulsion in the form of apparently dry and freely-flowing granules which method comprises forming a partially matured silver halide photographic gelatin emulsion into granules by double shredding, immersing the said granules in a substantially saturated solution of sodium sulphate containing a minor proportion of potash alum for a time sufficient to effect hardening of the surface layers of the granules but insufficient to affect substantially the subsequent reconstitution of the emulsion, separating the granules from the liquid and subjecting them to drying at a temperature of about 85° to 95° F. in a current of warm air having a relative humidity of 25 to 35% until the moisture content of said granules is reduced to 4 to 14% and substantially complete maturation of the emulsion has taken place and the granules are non-agglomerating and freely flowing.

7. A method of preparing a matured photographic gelatin emulsion in the form of apparently dry and freely-flowing granules which method comprises forming a partially matured silver halide photographic gelatin emulsion into granules by double shredding, immersing the said granules for a time of the order of 20 minutes in a concentrated aqueous solution of sodium sulphate of dehydrating strength containing a minor proportion of potash alum, separating the granules from the liquid and subjecting them to drying at a temperature from 85° to 90° F. in a current of air until the moisture content of said granules is reduced to 4 to 14% and the granules are apparently dry and freely flowing and until the emulsion is substantially completely matured.

8. A method of preparing a matured photographic gelatin emulsion in the form of apparently dry and freely-flowing granules which method comprises forming a partially matured silver halide photographic gelatin emulsion into granules by double shredding, immersing the granules in a concentrated aqueous solution of sodium sulphate of dehydrating strength containing potash alum in amount equal to 1% to 2.5% by weight of the weight of sodium sulphate, separating the granules from the liquid and subjecting them to drying at a temperature from about 85° to about 95° F. in a current of air until the moisture content of said granules is reduced to 4 to 14% and the granules are apparently dry and freely-flowing and until the emulsion is substantially completely matured.

9. A method of preparing a matured photographic gelatin emulsion in the form of apparently dry and freely-flowing granules which method comprises forming a partially matured silver halide photographic gelatin emulsion into granules by shredding through a perforated plate and then through a wire gauze of innocuous metal, treating the granules with a substantially saturated aqueous solution of sodium sulphate containing a minor proportion of potash alum to effect the hardening of the surface layers of the said granules, separating the granules from the liquid and subjecting them to drying at a temperature from about 85° to about 95° F. in a current of air until the moisture content of said granules is reduced to 4 to 14% and the granules are apparently dry and freely flowing and until the emulsion is substantially completely matured.

10. A stabilized silver halide photographic gelatin emulsion in the form of freely-flowing non-agglomerating surface-hardened granules having a moisture content between 4 and 14% and capable of being freely reconstituted to the gel state and obtained by the process set forth in claim 4.

THOMAS THORNE BAKER.